United States Patent [19]

Blomqvist et al.

[11] 4,209,210
[45] Jun. 24, 1980

[54] SELF-ALIGNING TWO ROW THRUST ROLLER BEARING

[75] Inventors: Leif Blomqvist; Göransson, both of Gothenburg, Sweden

[73] Assignee: Aktiebolaget SKF, Gothenburg, Sweden

[21] Appl. No.: 912,197

[22] Filed: Jun. 5, 1978

[30] Foreign Application Priority Data

Aug. 15, 1977 [SE] Sweden ............................ 7709175

[51] Int. Cl.² ............................................. F16C 19/10
[52] U.S. Cl. ................................... 308/234; 308/194; 308/214; 308/235
[58] Field of Search .............. 308/194, 214, 235, 219, 308/232–234, 217–218, 216, 215, , 211

[56] References Cited

U.S. PATENT DOCUMENTS

| 1,208,428 | 12/1916 | Whitney | 308/218 X |
| 1,645,345 | 10/1927 | Okner | 308/194 |
| 2,622,946 | 12/1952 | McKissick et al. | 308/211 |
| 3,004,809 | 10/1961 | Bratt | 308/235 X |
| 3,990,753 | 11/1976 | Kellstrom et al. | 308/214 |

*Primary Examiner*—Douglas C. Butler
*Attorney, Agent, or Firm*—Eugene E. Renz, Jr.

[57] ABSTRACT

A self-aligning thrust roller bearing comprising a pair of annular members having a common bearing axis and confronting coaxial raceways. The raceways are of arcuate cross-section and a plurality of symmetrical rollers are arranged in the annular space between the raceways in at least two rows. One of the arcuate raceways is a common raceway for the rollers of both rows. The other raceway comprises separate arcuate raceway sections. The axis of the rollers of each row is inclined in the same direction relative to the bearing axis. The angle of inclination of the rollers of each row are different and the mean angle between the bearing axis and the roller axis is between 20° and 90°. The rollers are guided without the aid of any flange engaging the roller ends.

4 Claims, 1 Drawing Figure

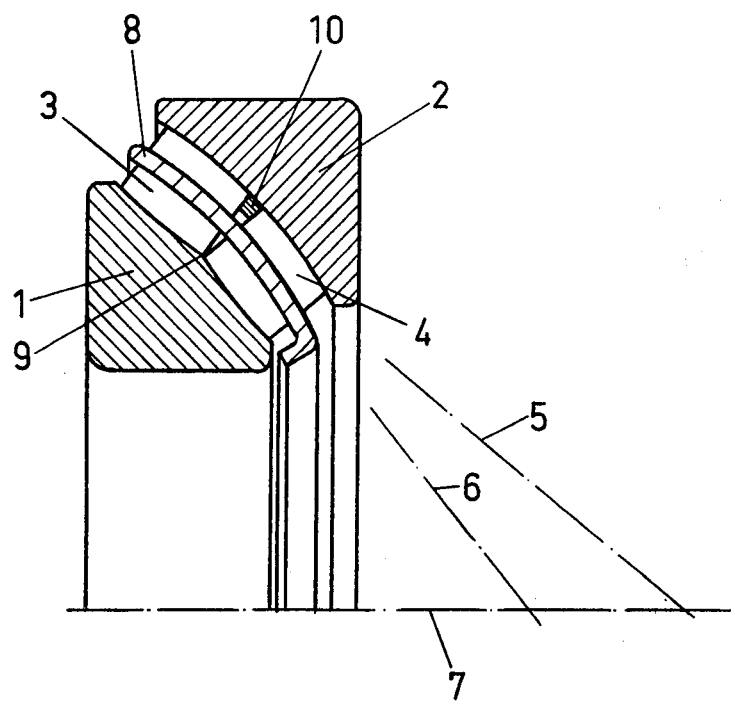

SELF-ALIGNING TWO ROW THRUST ROLLER BEARING

BACKGROUND OF THE INVENTION

This invention relates to a self-aligning thrust roller bearing incorporating at least two coaxial race tracks and a number of rollers provided between the race tracks and in engagement with these, said rollers being arranged in at least two rows beside each other, the race tracks and the rollers being curved in cross-section and the axes of the rollers being inclined in the same direction relative to the bearing axis.

Spherical thrust roller bearings are earlier known. These bearings generally have one row of unsymmetrical rollers, one bearing ring with a spherical race track and one bearing ring with a roller guiding flange.

Rings having flanges are expensive to manufacture and bearings having such rings have a high starting friction. It is thus desirable to avoid the need of the flange. A possible method for avoiding a flange is to use symmetrical rollers. A roller is in this respect considered to be symmetrical if it can be divided in two congruent halves with a cross sectional plane half way between the ends of the roller. Symmetrical rollers having such a large axial extension and being arranged with such a large angle between the roller axis and the bearing axis as the rollers appearing in spherical thrust bearings are however difficult to guide with a desired precision. Furthermore, the sliding in the contact points between the roller and the race track will be large, which leads to power losses and a risk for bearing failure due to the generated friction heat.

The purpose of the present invention is to provide a bearing of the type defined in the preamble, wherein a good roller guiding is obtained without a flange on one of the rings and which has low friction at start and during operation.

Due to the fact that all rollers of the bearing have the same revolution angular speed about the bearing axis only one cage for the rollers is needed, which saves space and cost. A good roller guiding can easily be obtained by the rollers being arranged to contact each other adjacent the inner race ring or by means of a guiding ring at the outer race ring. Both roller rows are subjected to load when the bearing takes up axial load, which guarantees a good guiding of all rollers. By using two rollers instead of one roller with a corresponding axial extension it is possible to halve the bearing friction losses, since the relative sliding at the contact between the roller and the race track, i.e. the relation between the sliding speed and the rolling speed, is about proportional to the length of the roller.

BRIEF DESCRIPTION OF THE DRAWINGS

Hereinafter the invention will be further described with reference to the accompanying drawing, which shows an axial section through a bearing according to an embodiment of the invention.

DESCRIPTION OF THE PREFERRED EMBODIMENT

The bearing has two rings 1 and 2 each having two axial race tracks for a number of symmetrical rollers 3, 4 provided between the rings, which rollers are arranged in double rows, whereby the rollers in both rows are preferably identical. The roller rows are situated side by side and the axes 5, 6 of the roller in each roller row are inclined in the same direction relative to the bearing axis 7. The race track of the ring 2 has preferably a spherical surface, which means that the ring 1 and the set of rollers with the rollers 3, 4 and roller cage 8 can be freely tilted relative to the ring 2 without causing a too high contact pressure at the contact between the roller and the race track. If only a limited self-alignment is aimed at, it is possible to let the surface of the race track be non-spherical.

As both roller rows will take up load when the bearing is subjected to axial load the load capacity of the bearing is of the same size as the load capacity of a one row bearing, the rollers of which are twice as long as the rollers 3 and 4 and has a corresponding contact angle. A limited length of the rollers 3, 4 together with the fact that both roller rows are exposed to load means that the guiding of the rollers will not cause any great difficulties. In order to obtain a good roller guiding it is possible to allow the ends of the rollers of rollers in different rows to contact each other adjacent the inner race ring 1 such as shown in point 9. Alternatively it is possible to arrange a guiding ring 10 between the roller rows adjacent the outer race ring.

In all roller bearings having curved race track profiles and correspondingly curved roller profiles a certain sliding will take place at the contact points between the roller race track and the roller, which will cause friction losses. An estimation of how large these losses are in a bearing is the size of the relative sliding in these contact points. The relative sliding is defined at the ratio between the sliding speed and the rolling speed in the contact points. It can be shown that in a bearing having symmetrical rollers and in which a pure rolling takes place in only one rolling contact point the relative sliding is proportional to the length of the roller. If the available length of the roller is divided on several rollers, such as in the present invention, the relative sliding is reduced and thereby also the friction losses as also the load is divided on several rollers.

The rollers of the two rows in a bearing according to the invention always have the same revolution angular speed relative to the bearing rings, as the bearing rings rotate relative to each other. A single cage can thus be used for both roller rows without risking that the rollers of one row will influence the rollers of the other row through the cage. Besides being space saving the use of one single cage means that the bearing will be more easy to manufacture and to handle as it incorporates as few separate parts as possible.

Within the scope of the invention it is possible to vary the bearing design within wide ranges. The mean angle between the bearing axis and the roller axes can for instance be chosen between 20° and 90°. The bearing can also be provided with three or more rows of rollers if it is desired to produce an extra large load capacity and a low relative sliding. The race tracks can also be arranged on more than two rings.

What is claimed is:

1. A self-aligning spherical thrust roller bearing comprising a pair of annular members having a common bearing axis and confronting coaxial raceways, the raceways being of arcuate cross-section, a plurality of rollers symmetrical about a central cross sectional plane through the roller and arranged in the annular space between the raceways in at least two rows, one of the arcuate raceways being a common raceway for the rollers of both rows, the other raceway being separate arcuate raceway sections, the axis of the rollers of each row being inclined in the same direction to the bearing axis, the angle of inclination of the rollers of each row being different and the mean angle between the bearing axis and the roller axis being between 20° and 90°, the rollers being guided without the aid of any flange engaging the roller ends.

2. A self-aligning thrust roller bearing according to claim 1, characterized thereby, that it has a single roller cage (8).

3. A self-aligning thrust roller bearing according to claim 1, characterized thereby, that it incorporates a roller guiding ring (10) provided between the rows of rollers.

4. A self-aligning thrust roller bearing according to claim 1, characterized thereby, that the adjacent ends of rollers in different rows are arranged to engage each other.

* * * * *